United States Patent
Hanrahan

(10) Patent No.: US 12,043,405 B2
(45) Date of Patent: Jul. 23, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/202,736

(22) Filed: May 26, 2023

(65) Prior Publication Data

US 2023/0382548 A1     Nov. 30, 2023

Related U.S. Application Data

(60) Provisional application No. 63/346,178, filed on May 26, 2022.

(51) Int. Cl.
| | | |
|---|---|---|
| *F02C 7/36* | (2006.01) | |
| *B64D 35/02* | (2006.01) | |
| *B64D 27/02* | (2006.01) | |

(52) U.S. Cl.
CPC .............. *B64D 35/02* (2013.01); *F02C 7/36* (2013.01); *B64D 27/026* (2024.01); *F05D 2260/40311* (2013.01)

(58) Field of Classification Search
CPC ..... B64D 35/02; B64D 2027/026; F02C 7/36; F05D 2260/40311
See application file for complete search history.

(56) References Cited

U.S. PATENT DOCUMENTS

| | | | |
|---|---|---|---|
| 3,678,690 A | 7/1972 | Shohet | |
| 4,651,521 A | 3/1987 | Ossi | |
| 4,791,783 A | 12/1988 | Neitzel | |
| 4,936,748 A | 6/1990 | Adamson | |
| 5,209,428 A | 5/1993 | Bevilaqua | |
| 6,269,627 B1 | 8/2001 | Freese | |
| 6,270,037 B1 | 8/2001 | Freese | |
| 10,876,411 B2 | 12/2020 | Ramirez | |
| 10,968,748 B2 | 4/2021 | Ramirez | |
| 11,060,587 B1 * | 7/2021 | Kobayashi | .............. F16H 61/12 |
| 11,073,160 B2 | 7/2021 | Murugan | |

(Continued)

FOREIGN PATENT DOCUMENTS

CN          111279060 A  *  6/2020  ............. F01D 15/10

OTHER PUBLICATIONS

"Overview of Variable-Speed Power-Turbine Research", https://core.ac.uk/download/pdf/10560017.pdf, Aug. 30, 2019.

(Continued)

*Primary Examiner* — Justin Holmes
(74) *Attorney, Agent, or Firm* — Getz Balich LLC

(57) ABSTRACT

An assembly is provided for an aircraft. The aircraft assembly includes a rotating structure, a geartrain, a propulsor rotor and an electric machine. The rotating structure includes a turbine rotor. The geartrain includes a sun gear, a ring gear, a plurality of intermediate gears and a carrier. The sun gear is rotatably driven by the rotating structure. Each of the intermediate gears is between and meshed with the sun gear and the ring gear. Each of the intermediate gears is rotatably mounted to the carrier. The propulsor rotor is rotatably driven by the carrier. The electric machine is coupled to the ring gear.

17 Claims, 7 Drawing Sheets

(56) References Cited

U.S. PATENT DOCUMENTS

| | | | |
|---|---|---|---|
| 11,168,616 B2* | 11/2021 | Kupratis | H02K 7/1823 |
| 2012/0133155 A1* | 5/2012 | Sorg | F03D 80/00 |
| | | | 290/55 |
| 2019/0382123 A1 | 12/2019 | Schwarz | |
| 2020/0017229 A1 | 1/2020 | Steinert | |
| 2020/0158213 A1 | 5/2020 | Leque | |
| 2020/0182158 A1* | 6/2020 | Kupratis | F01D 21/003 |
| 2020/0340406 A1 | 10/2020 | Maljean | |
| 2020/0354068 A1 | 11/2020 | Razak | |

OTHER PUBLICATIONS

"Overview of Variable-Speed Power-Turbine Research", https://www.science.gov/topicpages/v/variable-speed+power+turbine, Jan. 1, 2011.
"RVLT TC1.1:Variable Speed Power Turbine Tech Demo", https://techport.nasa.gov/view/93071, Jul. 21, 2021.
Ashlie Flegel, "Aerodynamic Measurements of a Variable-Speed Power-Turbine Blade Section in a Transonic Turbine Cascade" https://engagedscholarship.csuohio.edu/cgi/viewcontent.cgi?article=1852&context=etdarchive, May 2007.
Flegel-McVetta et al. "Aerodynamic Measurements of a Variable-Speed Power-Turbine Blade Section in a Transonic Turbine Cascade at Low Inlet Turbulence", NASA/TM-2013-218069, Aug. 2013.
EP Search Report for EP Patent Application No. 23175819.4 dated Oct. 20, 2023.

* cited by examiner

SELECTIVE POWER DISTRIBUTION FOR AN AIRCRAFT PROPULSION SYSTEM

This application claims priority to U.S. Patent Appln. No. 63/346,178 filed May 26, 2022 which is hereby incorporated herein by reference in its entirety.

BACKGROUND OF THE DISCLOSURE

1. Technical Field

This disclosure relates generally to an aircraft and, more particularly, to an aircraft propulsion system for alternately generating power for multi-directional propulsion.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft. The aircraft assembly includes a rotating structure, a geartrain, a propulsor rotor and an electric machine. The rotating structure includes a turbine rotor. The geartrain includes a sun gear, a ring gear, a plurality of intermediate gears and a carrier. The sun gear is rotatably driven by the rotating structure. Each of the intermediate gears is between and meshed with the sun gear and the ring gear. Each of the intermediate gears is rotatably mounted to the carrier. The propulsor rotor is rotatably driven by the carrier. The electric machine is coupled to the ring gear.

According to another aspect of the present disclosure, another assembly is provided for an aircraft. The aircraft assembly includes a first propulsor rotor, a second propulsor rotor, a geartrain, a gas turbine engine core and an electric machine. The gas turbine engine core includes a compressor section, a combustor section, a turbine section and a rotating structure. The rotating structure includes a turbine rotor within the turbine section. The rotating structure is configured to drive rotation of the first propulsor rotor independent of the geartrain. The rotating structure is configured to drive rotation of the second propulsor rotor through the geartrain. The electric machine is configured to drive rotation of the second propulsor rotor through the geartrain.

According to still another aspect of the present disclosure, another assembly is provided for an aircraft. The aircraft assembly includes a sun gear, a ring gear, a plurality of intermediate gears, a carrier, a propulsor rotor, a first power input and a second power input. The sun gear is rotatable about a centerline axis. The ring gear circumscribes the sun gear and is rotatable about the centerline axis. Each of the intermediate gears is between and is meshed with the sun gear and the ring gear. A carrier is rotatable about the centerline axis. Each of the intermediate gears is rotatably mounted to the carrier. The propulsor rotor is coupled to the carrier. The first power input is coupled to and is configured to drive rotation of the sun gear. The second power input is coupled to and is configured to drive rotation of the ring gear.

The geartrain may include a sun gear, a ring gear, a plurality of intermediate gears and a carrier. The sun gear may be coupled to the rotating structure. The ring gear may be coupled to the electric machine. Each of the intermediate gears may be between and may be meshed with the sun gear and the ring gear. The carrier may be coupled to the second propulsor rotor. Each of the intermediate gears may be rotatably mounted to the carrier.

The electric machine may be configured to drive rotation of the carrier about a centerline axis.

The electric machine may be configured to drive rotation of the carrier about a centerline axis down to a zero rotational speed.

The assembly may also include a lock device configured to lock rotation of the carrier about the centerline axis when the carrier is at the zero rotational speed.

The lock device may be configured as or otherwise include a splined coupling.

The electric machine may be configured to drive rotation of the ring gear about a centerline axis down to a zero rotational speed.

The assembly may also include a lock device configured to lock rotation of the ring gear about the centerline axis when the ring gear is at the zero rotational speed.

The lock device may be configured as or otherwise include a splined coupling.

The assembly may also include a first propulsor rotor rotatably driven by the rotating structure independent of the geartrain. The propulsor rotor may be a second propulsor rotor.

The electric machine may be configured to stop rotation of the second propulsor rotor while the first propulsor rotor continues to rotate.

A rotational axis of the first propulsor rotor may be angularly offset from a rotational axis of the second propulsor rotor.

The first propulsor rotor may be configured to generate propulsive force in a first direction. The second propulsor rotor may be configured to generate propulsive force in a second direction that is different than the first direction.

The assembly may also include a gas turbine engine core. The gas turbine engine core may include a compressor section, a combustor section, a turbine section and the rotating structure. The turbine rotor may be within the turbine section.

The gas turbine engine core may be configured to rotate the rotating structure at a first rotational speed during a first mode. The gas turbine engine core may be configured to rotate the rotating structure at a second rotational speed during a second mode that is less than eighty percent of the first rotational speed.

The second rotational speed may be between fifty-five percent and seventy-five percent of the first rotational speed.

The first propulsor rotor may be configured as or otherwise include a ducted rotor. In addition or alternatively, the second propulsor rotor may be configured as or otherwise include an open rotor.

The propulsor rotor may be configured to generate vertical propulsive lift.

The assembly may also include a transmission configured to: decouple the propulsor rotor from the carrier during a first mode; and couple the propulsor rotor to the carrier during a second mode.

The assembly may also include an electric machine configured to drive rotation of a component about the centerline axis down to a zero rotational speed. The component may be configured as or otherwise include the carrier or the ring gear.

The assembly may also include a lock device configured to lock rotation of the component about the centerline axis when the carrier is at the zero rotational speed.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
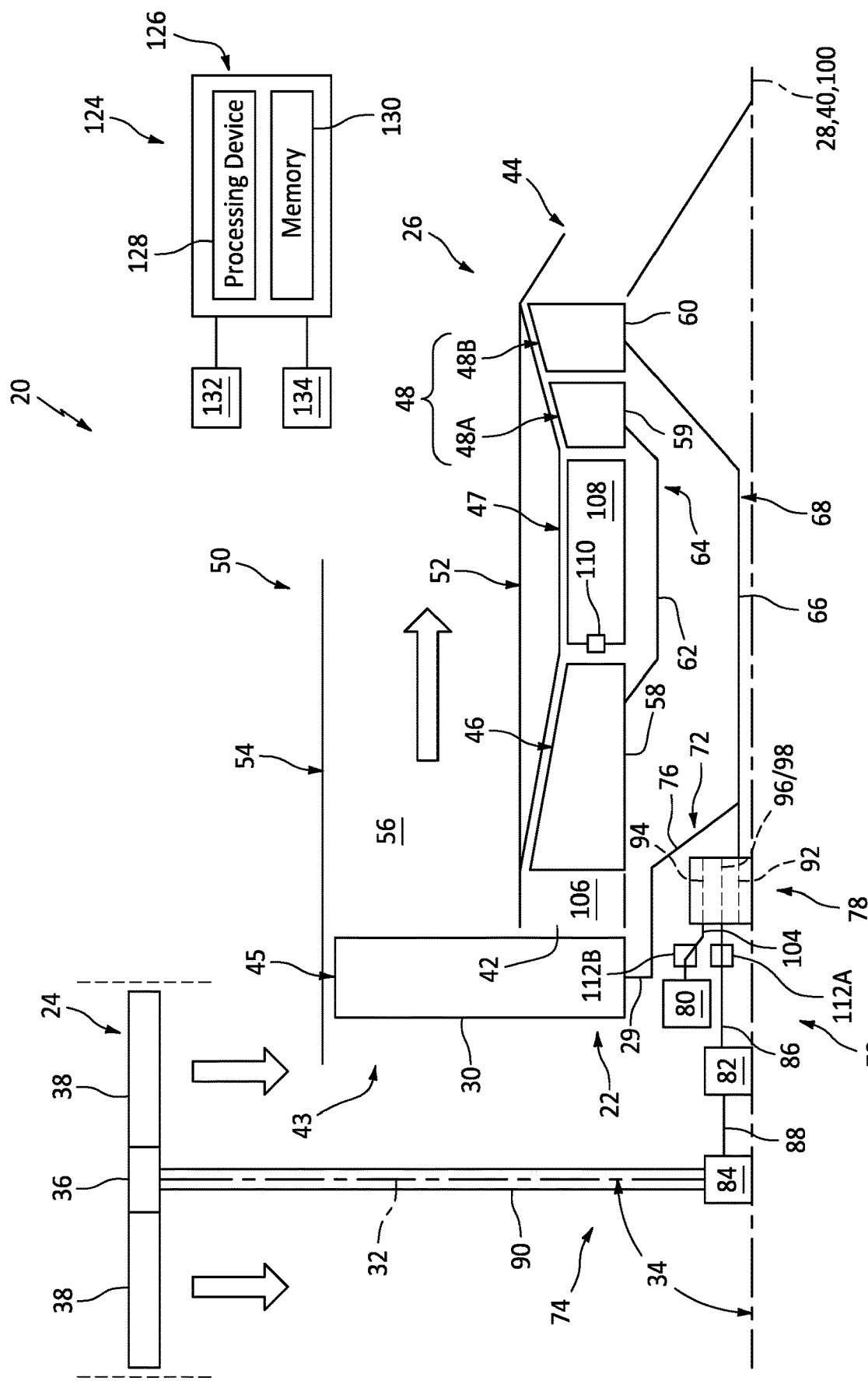
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction propulsion (e.g., horizontal thrust) and the second direction propulsion (e.g., vertical lift) during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 29 and a plurality of first rotor blades 30 (on visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream core exhaust nozzle 44; e.g., a fixed exhaust nozzle. The core axis 40 may be an axial centerline of the engine core 26 and may be horizontal when the aircraft is on the ground. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components 60 and 66 collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a first power transmission path 72 and a second power transmission path 74. The first power transmission path 72 transfers power from the low speed rotating structure 68 to the first propulsor rotor 22, for example independent of the second power transmission path 74. The second power transmission path 74 transfers power from the low speed rotating structure 68 to the second propulsor rotor 24, for example independent of the first power transmission path 72.

The first power transmission path 72 of FIG. 1 is configured as a first propulsor shaft 76. The first propulsor shaft 76 of FIG. 1 extends between and is connected to the first rotor disk 29 and the low speed rotating structure 68 and its low speed shaft 66. The first power transmission path 72, of course, may also or alternatively be configured as or otherwise include one or more other coupling devices; e.g., a shaft, a geartrain, a transmission, etc.

The second power transmission path 74 of FIG. 1 includes a geartrain 78 (e.g., an epicyclic geartrain), an electric machine 80, a transmission 82 and gearing 84 (e.g., bevel gearing). The second power transmission path 74 of FIG. 1 also includes one or more shafts 86, 88 and 90 and/or other coupling devices for coupling the second power transmission path elements 78, 82 and 84 together with the second propulsor rotor 22.

Figure 2:
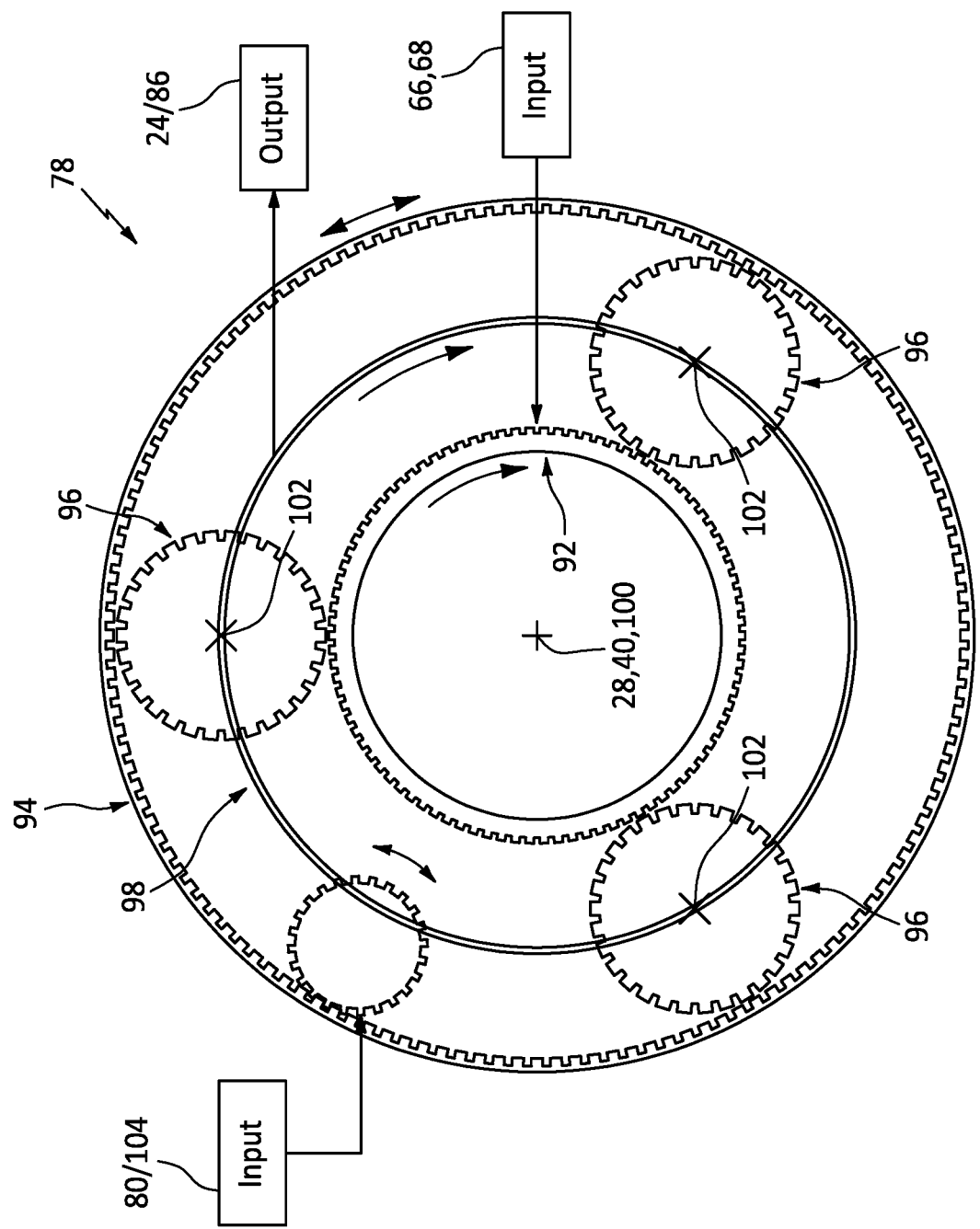
FIG. 2 is a schematic illustration of a geartrain within a powertrain for the aircraft propulsion system.

Referring to FIG. 2, the geartrain 78 may be configured as a biased torque differential. This geartrain 78 may transfer power from the low speed rotating structure 68 to the second propulsor rotor 24 during the second mode of operation. The geartrain 78 may also facilitate locking (e.g., stopping, preventing) rotation of the second propulsor rotor 24 about its second rotor axis 32 during the first mode of operation.

The geartrain 78 of FIG. 2 includes a sun gear 92 (e.g., an inner gear), a ring gear 94 (e.g., an outer gear), one or more intermediate gears 96 (e.g., planet or star gears) and a gear carrier 98. The sun gear 92 is rotatable about a centerline axis 100 of the geartrain 78, which centerline axis 100 may be parallel (e.g., coaxial) with the axis 28, 40. The ring gear 94 is rotatable about the centerline axis 100. The ring gear 94 extends circumferentially around (e.g., circumscribes) the sun gear 92 and an annular array of the intermediate gears 96. The intermediate gears 96 are arranged circumferentially about the centerline axis 100 in the annular array. Each of the intermediate gears 96 is radially between and meshed with the sun gear 92 and the ring gear 94. Each of the intermediate gears 96 is rotatable about a respective intermediate gear axis 102, and is rotatably mounted to and supported by the carrier 98. The carrier 98 is rotatable about the centerline axis 100.

The electric machine 80 of FIGS. 1 and 2 is coupled to the ring gear 94, where a coupling 104 between the electric machine 80 and the ring gear 94 provides a power input for the geartrain 78. The electric machine 80 is configured as an electric motor. For example, during a motor mode of operation, the electric machine 80 converts electricity received from a power source (e.g., a generator, one or more batteries, etc.) into mechanical power. This mechanical power is used for driving rotation of the ring gear 94. It is contemplated, however, the electric machine 80 may also be (but, need not be) configurable as an electric generator. For example, during a generator mode of operation, the electric machine 80 may convert mechanical power received through the geartrain 78 and its ring gear 94 into electricity. This electricity may be utilized for various purposes within the aircraft propulsion system 20 and/or for various purposes outside of the aircraft propulsion system 20. It is further contemplated that the electric machine 80 may be coupled to the ring gear 94 through a geartrain (and/or other device(s)) such that electric machine 80 may reside remotely from the geartrain 78 and its ring gear 94; for example, mounted to the inner case 52 or the outer case 54 of FIG. 1.

The sun gear 92 of FIGS. 1 and 2 is coupled to the low speed rotating structure 68 and its low speed shaft 66, where the low speed shaft 66 provides another power input for the geartrain 78. The carrier 98 and, thus, the intermediate gears 96 are coupled to the second propulsor rotor 24 through the second power transmission path elements 86, 82, 88, 84 and 90 (see FIG. 1), where the geartrain output shaft 86 provides a power output from the geartrain 78. More particularly, referring to FIG. 1, the carrier 98 is coupled to the transmission 82 through the geartrain output shaft 86.

An output of the transmission 82 is connected to the gearing 84 through the transmission output shaft 88. This transmission 82 may be configured to selectively couple (e.g., transfer mechanical power between) the geartrain output shaft 86 and the transmission output shaft 88. During the first mode of operation, for example, the transmission 82 may be configured to decouple the geartrain output shaft 86 from the transmission output shaft 88, thereby decoupling the low speed rotating structure 68 (and the electric machine 80) from the second propulsor rotor 24. During the second mode of operation (e.g., and the third mode of operation), the transmission 82 may be configured to couple the geartrain output shaft 86 with the transmission output shaft 88, thereby coupling the low speed rotating structure 68 (and the electric machine 80) with the second propulsor rotor 24. The transmission 82 may be configured as a clutched transmission or a clutchless transmission.

An output of the gearing 84 is connected to the second propulsor rotor 24 through the second propulsor shaft 90. This gearing 84 provides a coupling between the transmission output shaft 88 rotating about the axis 28, 40, 100 and the second propulsor shaft 90 rotating about the second rotor axis 32. The gearing 84 may also provide a speed change mechanism between the transmission output shaft 88 and the second propulsor shaft 90. The gearing 84, however, may alternatively provide a 1:1 rotational coupling between the transmission output shaft 88 and the second propulsor shaft 90 such that these shafts 88 and 90 rotate at a common (e.g., the same) speed. Furthermore, in some embodiments, the gearing 84 and the transmission output shaft 88 may be omitted where the functionality of the gearing 84 is integrated into the transmission 82. In still other embodiments, the transmission 82 may be omitted where decoupling of the second propulsor rotor 24 is not required.

During operation of the aircraft propulsion system 20, air enters the engine core 26 through the airflow inlet 42. This air is directed into a core flowpath 106 which extends sequentially through the compressor section 46, the combustor section 47, the HPT section 48A and the LPT section 48B to the core exhaust nozzle 44. The air within this core flowpath 106 may be referred to as core air.

The core air is compressed by the compressor rotor 58 and directed into a (e.g., annular) combustion chamber 108 of a (e.g., annular) combustor in the combustor section 47. Fuel is injected into the combustion chamber 108 through one or more fuel injectors 110 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 drives rotation of the first propulsor rotor 22 through the first power transmission path 72 (e.g., independent of the second power transmission path 74) during a select mode or modes of operation; e.g., the first and the third modes of operation. The rotation of the low speed rotating structure 68 drives rotation of the second propulsor rotor 24 through the second power transmission path 74 (e.g., independent of the first power transmission path 72) during a select mode or modes of operation; e.g., the second and the third modes of operation. During the first mode of operation, the transmission 82 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During at least the first mode of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During at least the second mode of operation, the rotation of the second propulsor rotor 24 propels additional air (separate from the core air and the bypass air) to provide the second direction propulsion; e.g., vertical lift. The aircraft may thereby take-off, land and/or otherwise hover during the second mode of operation, and the aircraft may fly forward or otherwise move during the first mode of operation.

To facilitate selective rotation of the second propulsor rotor 24 during the various modes of operation, the aircraft propulsion system 20 of FIG. 1 includes one or more lock devices 112A and 112B (generally referred to as 112). The lock device 112A is configured to selectively lock (e.g., stop, prevent) rotation of the carrier 98 and/or any one or more system elements 24, 82, 84, 86, 88 and/or 90 coupled to the carrier 98 during, for example, the first mode of operation. The lock device 112A is configured to selectively unlock (e.g., permit, facilitate) rotation of the carrier 98 and/or any one or more system elements 24, 82, 84, 86, 88 and/or 90 coupled to and driven by the carrier 98 during, for example, the second and/or the third modes of operation. The lock device 112B is configured to selectively lock (e.g., stop, prevent) rotation of the coupling 104 and/or any one or more system elements 80 and 94 coupled to the coupling 104 during, for example, the first and/or second modes of operation. The lock device 112B is configured to selectively unlock (e.g., permit, facilitate) rotation of the coupling 104 and/or any one or more system elements 80 and 94 coupled to and driven by the coupling 104 during, for example, the third mode of operation.

Figure 3:
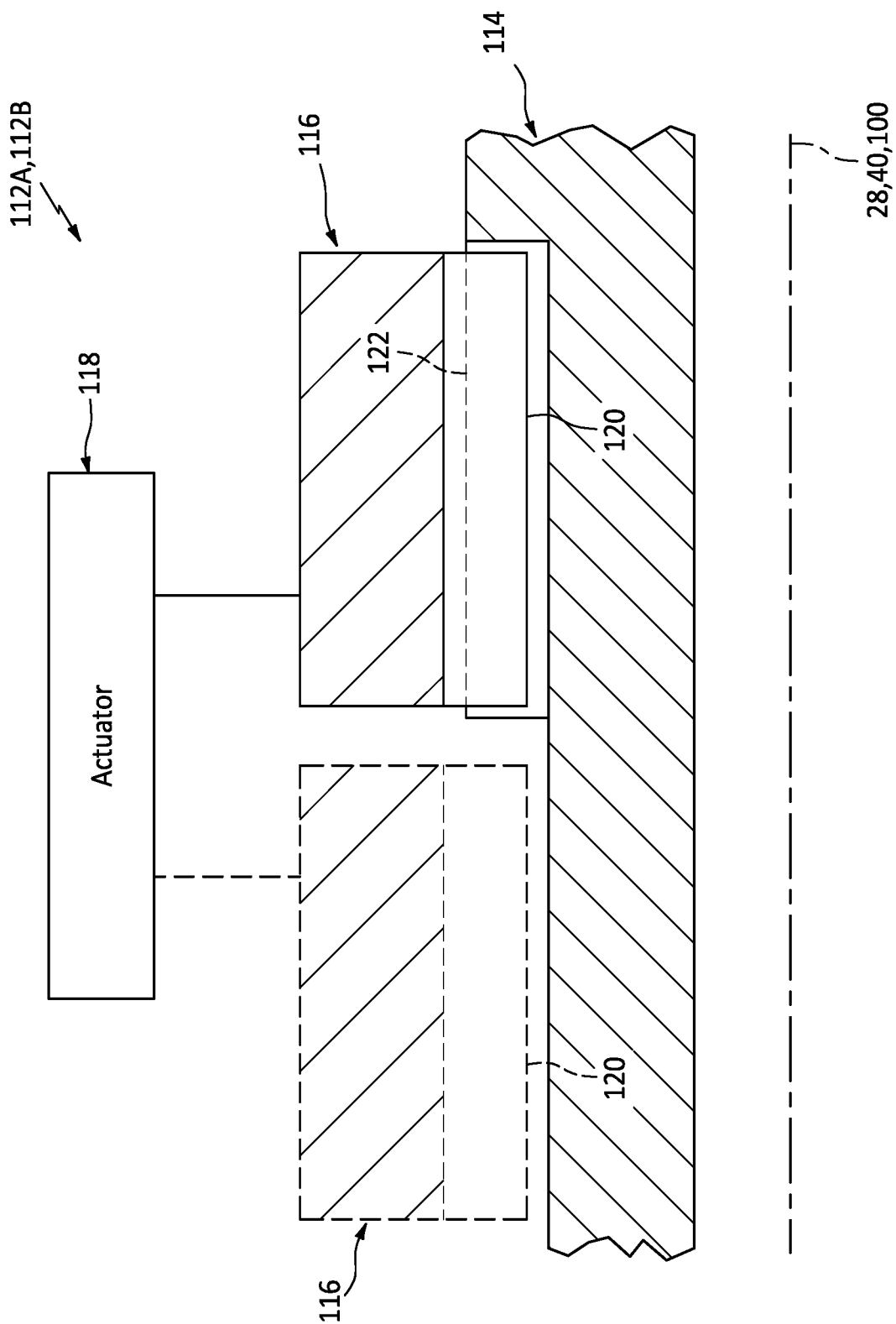
FIG. 3 is a partial side sectional schematic illustration of a lock device.

Referring to FIG. 3, each lock device 112A, 112B may be configured as a splined coupling. More particularly, the lock device 112A, 112B of FIG. 3 includes an inner lock element 114 (e.g., a splined shaft), an outer lock element 116 (e.g., a splined sleeve) and an actuator 118. The inner lock element 114 is rotatable about the axis 28, 40, 100. The outer lock element 116 is rotationally fixed about the axis 28, 40, 100. However, the actuator 118 is configured to move (e.g., axially translate) the outer lock element 116 along the axis 28, 40, 100 and the inner lock element 114 between an unlocked position (see dashed line in FIG. 3) and a locked position (see solid line in FIG. 3; see also FIG. 4). At the unlocked position, splines 120 of the outer lock element 116 are disengaged (e.g., spaced) from splines 122 of the inner lock element 114. At the locked position, the splines 120 of the outer lock element 116 are engaged (e.g., meshed) with the splines 122 of the inner lock element 114 (see also FIG. 4). With this arrangement, when the lock device 112A, 112B is unlocked and its outer lock element 116 is in the unlocked position, the inner lock element 114 may rotate (e.g., freely, unencumbered by the outer lock element 116) about the axis 28, 40, 100. However, when the respective lock device 112A, 112B is locked and its outer lock element 116 is in the locked position of FIG. 4, the outer lock element 116 is meshed with the inner lock element 114 and prevents rotation of the inner lock element 114 about the axis 28, 40, 100.

Figure 4:
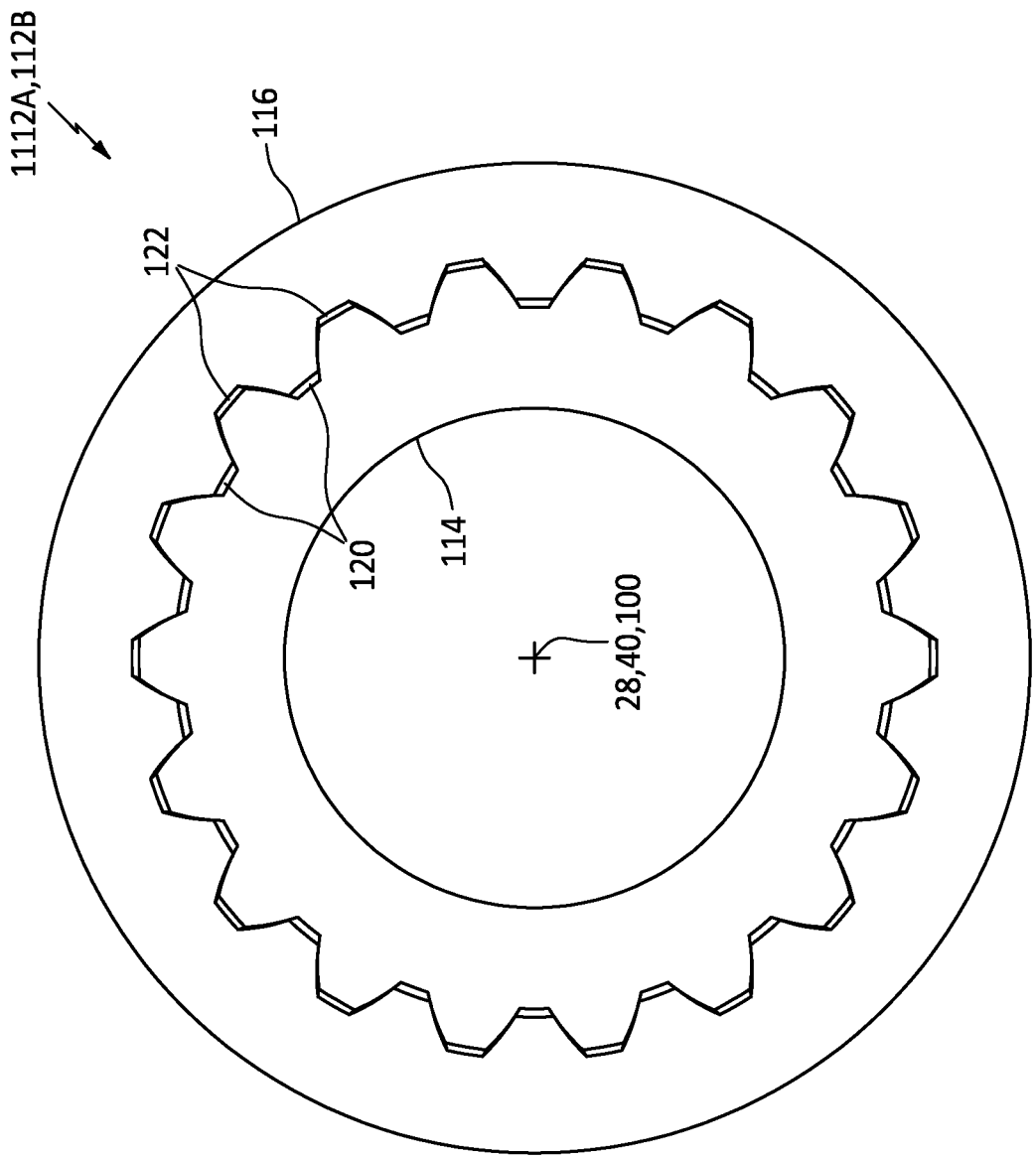
FIG. 4 is a cross-sectional illustration of the lock device.

Referring to FIGS. 1 and 3, the inner lock element 114 of the lock device 112A may be configured as part of or may be attached (directly or indirectly) to the geartrain output shaft 86, or any other one of the system elements 24, 82, 84, 88, 90 or 98 of FIGS. 1 and 2. The inner lock element 114 of the lock device 112B may be configured as part of or may be attached (directly or indirectly) to the coupling 104, or any other one of the system elements 80 and/or 94 of FIGS. 1 and 2. While the inner lock element 114 of FIGS. 3 and 4 is described as the rotating element and the outer lock element 116 is described as the rotationally fixed element, the operation of these elements 114 and 116 may be switched in other embodiments. In particular, the inner lock element 114 may alternatively be configured as the rotationally fixed element and axially translatable by the actuator 118, and the outer lock element 116 may be configured as the rotating element. Furthermore, various other types of rotational lock devices are known in the art, and the present disclosure is not limited to any particular ones thereof.

When transitioning into at least the first mode of operation, the electric machine 80 may be used to facilitate operation of the lock device 112A. For example, where the lock devices 112A and 112B are disengaged (e.g., unlocked) during the second or the third mode of operation, both the first propulsor rotor 22 and the second propulsor rotor 24 may be rotating. To facilitate engagement of the lock device 112A, the electric machine 80 of FIG. 2 is operated as the electric motor to drive rotation of the ring gear 94 in a first direction about the centerline axis 100. Increasing a rotational speed of the ring gear 94 in the first direction decreases a rotational speed of the carrier 98 about the centerline axis 100. The electric machine 80 may thereby increase the rotational speed of the ring gear 94 in the first direction to drive the rotational speed of the carrier 98 towards (e.g., down to) a zero rotational speed. Once the carrier 98 is at a zero rotational speed about the centerline axis 100 (e.g., rotationally fixed), the lock device 112A of FIGS. 3 and 4 may be engaged. The electric machine 80 may then be turned off (or otherwise used), and the lock device 112A of FIG. 1 may maintain the carrier 98 rotationally fixed. While the electric machine 80 is off, the ring gear 94 may rotate (e.g., windmill) or be stopped via an optional brake and the lock device 112B may be engaged. With this arrangement, the second propulsor rotor 24 is rotationally fixed, the first propulsor rotor 22 is rotatably driven by the low speed rotating structure 68 (e.g., independent of the geartrain 78) and the aircraft propulsion system 20 is operated in its first mode of operation. Alternatively, the electric machine 80 may be operated to drive the rotational speed of the coupling 104/the ring gear 94 towards (e.g., down to) a zero rotational speed. Once the coupling 104/the ring gear 94 is at a zero rotational speed about the centerline axis 100 (e.g., rotationally fixed), the lock device 112B of FIGS. 3 and 4 may be engaged.

Once the lock device 112A is (or the lock devices 112A and 112B are) engaged, the transmission 82 may decouple the geartrain 78 from the second propulsor rotor 24 to allow windmilling of the second propulsor rotor 24. Of course, windmilling may be prevented using an optional second propulsor rotor brake. Alternatively, the transmission 82 may maintain the coupling between the geartrain 78 and the second propulsor rotor 24 (or the transmission 82 may be omitted) since rotation of the carrier 98 and, thus, the second propulsor rotor 24 is locked by the lock device 112A.

To switch from the first mode of operation to the second mode of operation, the lock device 112A and 112B may be disengaged, for example, following coupling of the geartrain 78 to the second propulsor rotor 24 by the transmission 82. Rotation of the ring gear 94 may be locked (e.g., braked) or allowed to freewheel. The low speed rotating structure 68 may thereby drive rotation of the second propulsor rotor 24 through the second power transmission path 74 and its geartrain 78.

During each mode of operation, the low speed rotating structure 68 is coupled to the first propulsor rotor 22 through the first power transmission path 72. Rotation of the first propulsor rotor 22 at or above a certain rotational speed may generate horizontal thrust during the first mode of operation to propel the aircraft horizontally forward. Generating horizontal thrust (or significant amounts of horizontal thrust) may hinder and/or be less advantageous for certain aircraft takeoff, landing and/or hovering maneuvers during the second mode of operation. Furthermore, producing horizontal thrust with the first propulsor rotor 22 during the second mode of operation may also use up engine core power that could otherwise be provided to the second propulsor rotor 24 for vertical aircraft lift. The aircraft propulsion system 20 of FIG. 1 is therefore provided with a propulsion control system 124. This propulsion control system 124 is configured to reduce (or ideally eliminate) the horizontal thrust generated by the first propulsor rotor 22 during the second mode of operation.

The propulsion control system 124 of FIG. 1 includes the engine core 26 and an engine controller 126. The engine controller 126 may be implemented with a combination of hardware and software. The hardware may include at least one processing device 128 and memory 130. The processing device 128 may include one or more single-core and/or multi-core processors. The hardware may also or alternatively include analog and/or digital circuitry other than that described above.

The memory 130 is configured to store software (e.g., program instructions) for execution by the processing device 128, which software execution may control and/or facilitate performance of one or more operations such as those described below. The memory 130 may be a non-transitory computer readable medium. For example, the memory 130 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The engine controller 126 is configured to selectively control operation of the engine core 26. The engine controller 126, for example, may signal a fuel flow device 132 (e.g., a fuel pump, a fuel valve, etc.) to regulate (e.g., maintain, increase or decrease) fuel delivery to the injectors 110. The engine controller 126 may signal an actuator 134 coupled to a variable vane array within one of the engine sections 46, 48 to regulate (e.g., maintain, increase or decrease) gas flow through the variable vane array. The engine controller 126, of course, may also or alternatively signal one or more other devices within the aircraft propulsion system to influence operation of the engine core 26.

During the first mode of operation, the engine core 26 is operated by the engine controller 126 to rotate the low speed rotating structure 68 at a relatively fast first rotational speed (X) about the axis 28, 40. During the second mode of operation, the engine core 26 is operated by the engine controller 126 to rotate the low speed rotating structure 68 at a relatively slow second rotational speed (Y) about the axis 28, 40, 100. The second rotational speed is selected to be less than the first rotational speed. The second rotational speed, for example, may be equal to or less than eighty percent (80%) of the first rotational speed. More particularly, the second rotational speed may be between fifty-five percent (55%) and seventy-five percent (75%) of the first rotational speed.

Figure 5:
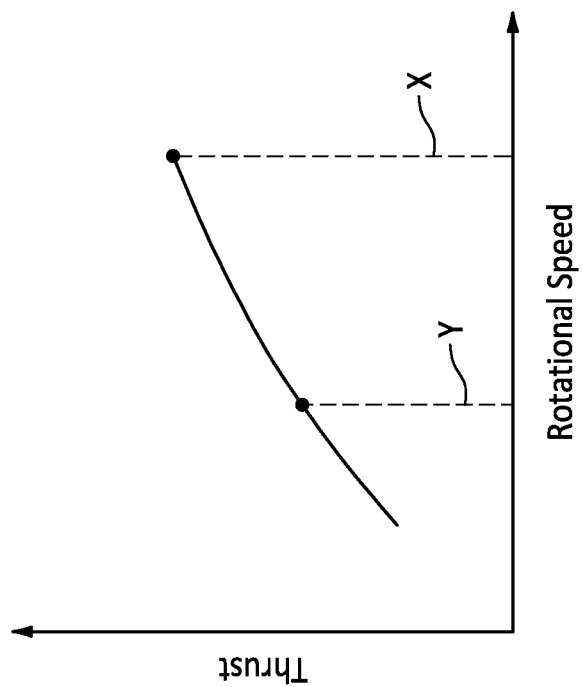
FIG. 5 is a graph depicting a relationship between rotational speed and thrust.

Referring to FIGS. 1 and 5, rotational speed of the first propulsor rotor 22 may be directly related to the propulsive thrust generated by the first propulsor rotor 22. Therefore, since the low speed rotating structure 68 drives rotation of the first propulsor rotor 22, decreasing the rotational speed of the low speed rotating structure 68 may reduce the propulsive thrust generated by the first propulsor rotor 22. The first propulsor rotor 22 may thereby generate less propulsive thrust during the second mode of operation where the low speed rotating structure 68 is rotating at the relatively slow second rotational speed than during the first mode of operation where the low speed rotating structure 68 is rotating at the relatively fast first rotational speed.

The blades 30 of the first propulsor rotor 22 of FIG. 1 may have blade profiles designed to provide relatively high (e.g., maximum) efficiency and/or generate relatively high (e.g., maximum) propulsive thrust while the low speed rotating structure 68 is rotating at the first rotational speed. These blade profiles may also be designed to generate relatively low or de minimis thrust while the low speed rotating structure 68 is rotating at the second rotational speed. The propulsive thrust generated by the first propulsor rotor 22 during the first mode (or the third mode) of operation, for example, may be at least one and one-half times (1.5×), two times (2×), five times (5×) or more the thrust/propulsive power generated by the first propulsor rotor 22 (if any at all) during the second mode of operation. Since the thrust generated by (e.g., work performed by) the first propulsor rotor 22 is significantly reduced (or ideally eliminated) during the second mode of operation, more rotational power may be transmitted from the low speed rotating structure 68 to the second propulsor rotor 24 during the second mode of operation.

While the first propulsor rotor 22 may be tuned (e.g., optimized) for rotation of the low speed rotating structure 68 at the first rotational speed, the second propulsor rotor 24 may be tuned (e.g., optimized) for rotation of the low speed rotating structure 68 at the second rotational speed. More particularly, the blades 38 of the second propulsor rotor 24 may have blade profiles designed to provide relatively high (e.g., maximum) efficiency and/or generate relatively high (e.g., maximum) propulsive lift while the low speed rotating structure 68 is rotating at the second rotational speed. Therefore, even though the first propulsor rotor 22 is generating less thrust during the second mode of operation, the second propulsor rotor 24 may be operating to its full potential.

Figure 6:
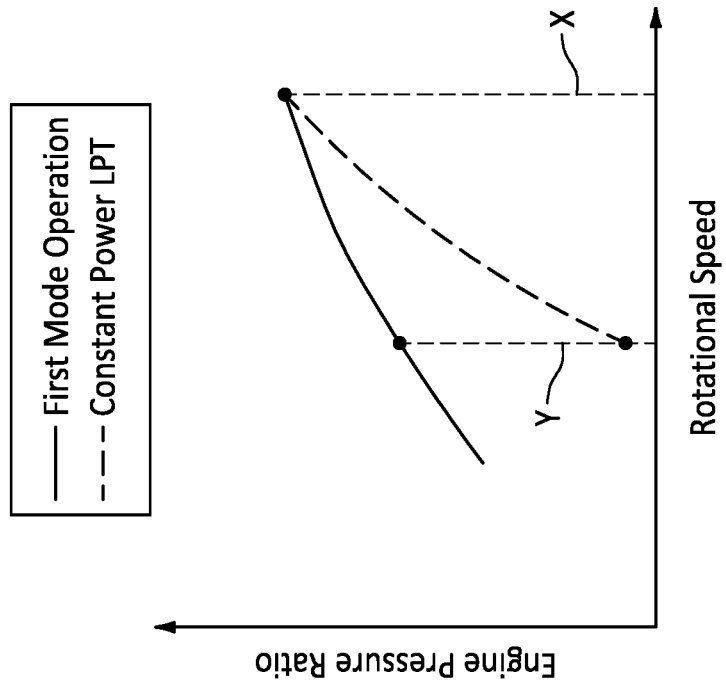
FIG. 6 is a graph depicting a relationship between rotational speed and engine pressure ratio (EPR).

Reducing the rotational speed of the low speed rotating structure 68 reduces compression performed by the first propulsor rotor 22 and, thus, a pressure ratio across a section which includes the first propulsor rotor 22, and the compressor section 46. However, the LPT section 48B may have a substantially uniform pressure ratio across a range of rotational speeds using, for example, the incident-tolerant aerodynamics. Therefore, referring to FIG. 6, reducing the rotational speed of the low speed rotating structure 68 may also reduce an engine pressure ratio (EPR) of the aircraft propulsion system 20 and, thus, (e.g., horizontal) propulsive thrust generated by the engine core 26. This engine pressure ratio may be measured as a total gas pressure at the exhaust nozzle 44 divided by a total gas pressure at an airflow inlet 43 to the propulsor section 45. For example, while the low speed rotating structure 68 is rotating at the first rotational speed during the first mode of operation, the aircraft propulsion system 20 may have a first engine pressure ratio greater than 1.2; e.g., between 1.25 and 3.0. However, while the low speed rotating structure 68 is rotating at the second rotational speed during the second mode of operation, the aircraft propulsion system 20 may have a second engine pressure ratio less than 1.1; e.g., between 1.01 and 1.06. Decreasing the rotational speed of the low speed rotating structure 68 may thereby reduce both horizontal thrust generated by the first propulsor rotor 22 and the engine core 26.

Figure 7:
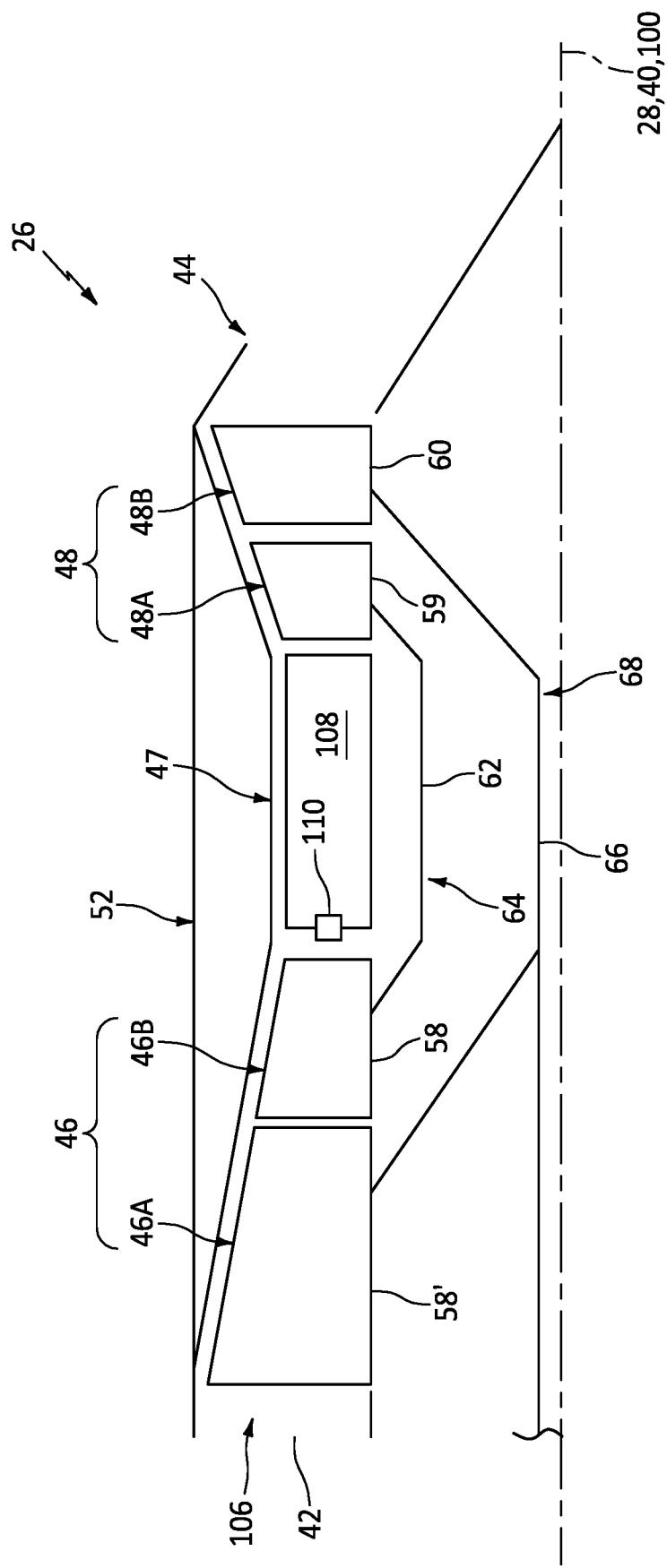
FIG. 7 is a partial schematic illustration of a gas turbine engine core with multi-staged compressor rotors.

In some embodiments, referring to FIG. 1, the low speed rotating structure 68 may be configured without a compressor rotor. In other embodiments, referring to FIG. 7, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 8:
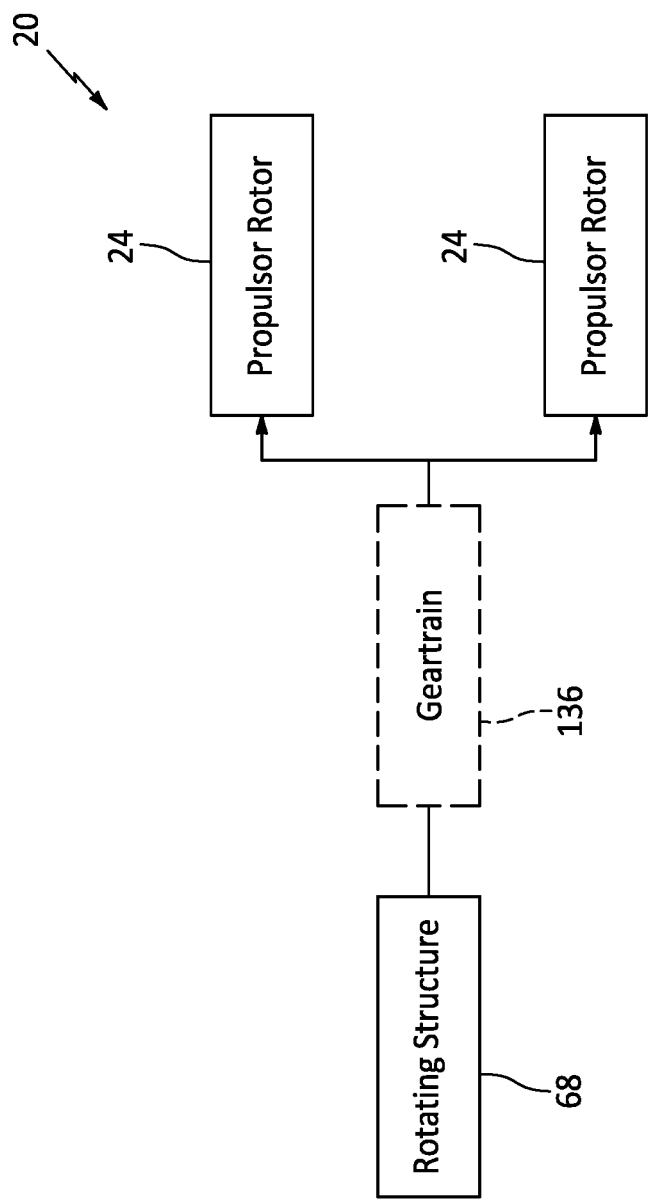
FIG. 8 is a partial schematic illustration of a rotating structure coupled to and driving multiple propulsor rotors for generating propulsive lift.

The engine core 26 may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors 22 and 24. The aircraft propulsion system 20, for example, may include two or more of the first propulsor rotors 22 and/or two or more of the second propulsor rotors 24. For example, the aircraft propulsion system 20 of FIG. 8 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 136.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
    a rotating structure comprising a turbine rotor;
    a geartrain including a sun gear, a ring gear, a plurality of intermediate gears and a carrier, the sun gear rotatably driven by the rotating structure, each of the plurality of intermediate gears between and meshed with the sun gear and the ring gear, and each of the plurality of intermediate gears rotatably mounted to the carrier;
    a first propulsor rotor rotatably driven by the rotating structure independent of the geartrain;
    a second propulsor rotor rotatably driven by the carrier; and
    an electric machine coupled to the ring gear.

2. The assembly of claim 1, wherein the electric machine is configured to drive rotation of the carrier about a centerline axis.

3. The assembly of claim 1, wherein the electric machine is configured to drive rotation of the carrier about a centerline axis down to a zero rotational speed.

4. The assembly of claim 3, further comprising a lock device configured to lock rotation of the carrier about the centerline axis when the carrier is at the zero rotational speed.

5. The assembly of claim 4, wherein the lock device comprises a splined coupling.

6. The assembly of claim 1, wherein the electric machine is configured to drive rotation of the ring gear about a centerline axis down to a zero rotational speed.

7. The assembly of claim 6, further comprising a lock device configured to lock rotation of the ring gear about the centerline axis when the ring gear is at the zero rotational speed.

8. The assembly of claim 7, wherein the lock device comprises a splined coupling.

9. The assembly of claim 1, wherein the electric machine is configured to stop rotation of the second propulsor rotor while the first propulsor rotor continues to rotate.

10. The assembly of claim 1, wherein a rotational axis of the first propulsor rotor is angularly offset from a rotational axis of the second propulsor rotor.

11. The assembly of claim 1, wherein
    the first propulsor rotor is configured to generate propulsive force in a first direction; and
    the second propulsor rotor is configured to generate propulsive force in a second direction that is different than the first direction.

12. The assembly of claim 1, further comprising:
    a gas turbine engine core including a compressor section, a combustor section, a turbine section and the rotating structure;
    the turbine rotor within the turbine section.

13. An assembly for an aircraft, comprising:
a gas turbine engine core including a compressor section, a combustor section, a turbine section and a rotating structure, the rotating structure comprising a turbine rotor within the turbine section;
a geartrain including a sun gear, a ring gear, a plurality of intermediate gears and a carrier, the sun gear rotatably driven by the rotating structure, each of the plurality of intermediate gears between and meshed with the sun gear and the ring gear, and each of the plurality of intermediate gears rotatably mounted to the carrier;
a propulsor rotor rotatably driven by the carrier; and
an electric machine coupled to the ring gear;
the gas turbine engine core configured to rotate the rotating structure at a first rotational speed during a first mode; and
the gas turbine engine core configured to rotate the rotating structure at a second rotational speed during a second mode that is less than eighty percent of the first rotational speed.

14. The assembly of claim 13, wherein the second rotational speed is between fifty-five percent and seventy-five percent of the first rotational speed.

15. An assembly for an aircraft, comprising:
a first propulsor rotor;
a second propulsor rotor;
a geartrain;
a gas turbine engine core including a compressor section, a combustor section, a turbine section and a rotating structure, the rotating structure comprising a turbine rotor within the turbine section, the rotating structure configured to drive rotation of the first propulsor rotor independent of the geartrain, and the rotating structure configured to drive rotation of the second propulsor rotor through the geartrain; and
an electric machine configured to drive rotation of the second propulsor rotor through the geartrain.

16. The assembly of claim 15, wherein geartrain includes
a sun gear coupled to the rotating structure;
a ring gear coupled to the electric machine;
a plurality of intermediate gears, each of the plurality of intermediate gears between and meshed with the sun gear and the ring gear; and
a carrier coupled to the second propulsor rotor, each of the plurality of intermediate gears rotatably mounted to the carrier.

17. An assembly for an aircraft, comprising:
a sun gear rotatable about a centerline axis;
a ring gear circumscribing the sun gear and rotatable about the centerline axis;
a plurality of intermediate gears, each of the plurality of intermediate gears between and meshed with the sun gear and the ring gear;
a carrier rotatable about the centerline axis, each of the plurality of intermediate gears rotatably mounted to the carrier;
a propulsor rotor coupled to the carrier;
a first power input coupled to and configured to drive rotation of the sun gear;
a second power input coupled to and configured to drive rotation of the ring gear;
an electric machine configured to drive rotation of a component about the centerline axis down to a zero rotational speed, the component comprising the carrier or the ring gear; and
a lock device configured to lock rotation of the component about the centerline axis when the carrier is at the zero rotational speed.

* * * * *